(12) United States Patent
Chen et al.

(10) Patent No.: US 8,972,494 B2
(45) Date of Patent: Mar. 3, 2015

(54) SCHEDULING CALENDAR ENTRIES VIA AN INSTANT MESSAGING INTERFACE

(75) Inventors: Yen-Fu Chen, Austin, TX (US); John Hans Handy-Bosma, Cedar Park, TX (US); Mei Yang Selvage, Pocatello, ID (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2864 days.

(21) Appl. No.: 11/335,448

(22) Filed: Jan. 19, 2006

(65) Prior Publication Data
US 2007/0168447 A1 Jul. 19, 2007

(51) Int. Cl.
| G06F 15/16 | (2006.01) |
| G06Q 10/10 | (2012.01) |
| H04L 12/58 | (2006.01) |
| H04L 12/18 | (2006.01) |

(52) U.S. Cl.
CPC ............ *G06Q 10/107* (2013.01); *G06Q 10/109* (2013.01); *H04L 51/04* (2013.01); *H04L 51/22* (2013.01); *H04L 12/1818* (2013.01)
USPC ........................... 709/204; 709/205; 709/206

(58) Field of Classification Search
CPC .............. H04L 12/1818; H04L 67/306; H04L 29/08936; H04L 2213/1324; G06Q 10/109
USPC .................................................. 709/206, 205
See application file for complete search history.

(56) References Cited

U.S. PATENT DOCUMENTS

| 5,579,375 A | 11/1996 | Ginter |
| 6,640,230 B1 * | 10/2003 | Doss et al. ............................ 1/1 |
| 6,728,360 B1 | 4/2004 | Brennan |
| 6,751,299 B1 | 6/2004 | Brown et al. |
| 6,785,266 B2 | 8/2004 | Swartz |
| 6,823,057 B1 | 11/2004 | Pershan et al. |

(Continued)

FOREIGN PATENT DOCUMENTS

| CA | 2570859 A1 | 6/2007 |
| JP | 2001075694 A | 3/2001 |

(Continued)

OTHER PUBLICATIONS

U.S. Appl. No. 11/334,228, Chen et al.

(Continued)

*Primary Examiner* — Asad Nawaz
*Assistant Examiner* — Jason Harley
(74) *Attorney, Agent, or Firm* — Yee & Associates, P.C.; Lisa J. Ulrich

(57) ABSTRACT

A computer implemented method, data processing system, and computer program product for scheduling calendaring entries within the context of an instant messaging client. The instant messaging client receives input from a user to schedule an instant messaging chat session with one or more invitees, wherein the one or more invitees are selected from a list of contacts in the instant messaging client. The instant messaging client provides a scheduling interface to the user, wherein the scheduling interface allows the user to define properties for the instant messaging chat session. Responsive to receiving user input defining the instant messaging chat session, an entry is created in the user's calendaring system to form a scheduled instant messaging chat session, wherein the entry is based on the properties defined in the scheduling interface.

19 Claims, 4 Drawing Sheets

(56) References Cited

U.S. PATENT DOCUMENTS

| | | | |
|---|---|---|---|
| 6,914,970 | B2 | 7/2005 | Huang et al. |
| 6,941,345 | B1 | 9/2005 | Kapil et al. |
| 6,954,524 | B2 | 10/2005 | Gibson |
| 6,956,941 | B1 | 10/2005 | Duncan et al. |
| 7,383,303 | B1 | 6/2008 | Bort |
| 7,383,308 | B1* | 6/2008 | Groves et al. ............ 709/206 |
| 7,391,526 | B2 | 6/2008 | Nishimura |
| 7,567,662 | B1 | 7/2009 | Renner et al. |
| 7,660,904 | B2 | 2/2010 | Qureshi et al. |
| 2001/0016852 | A1* | 8/2001 | Peairs et al. ............ 707/204 |
| 2001/0051928 | A1 | 12/2001 | Brody |
| 2002/0188620 | A1 | 12/2002 | Doss et al. |
| 2003/0046296 | A1 | 3/2003 | Doss et al. |
| 2003/0182356 | A1 | 9/2003 | Limoges et al. |
| 2003/0233265 | A1 | 12/2003 | Lee et al. |
| 2004/0003042 | A1 | 1/2004 | Horvitz et al. |
| 2004/0039779 | A1* | 2/2004 | Amstrong et al. ............ 709/204 |
| 2004/0078448 | A1 | 4/2004 | Malik et al. |
| 2004/0128181 | A1* | 7/2004 | Zurko et al. ............ 705/9 |
| 2004/0154022 | A1 | 8/2004 | Boss et al. |
| 2004/0194116 | A1 | 9/2004 | McKee et al. |
| 2004/0267585 | A1 | 12/2004 | Anderson et al. |
| 2005/0027805 | A1 | 2/2005 | Aoki |
| 2005/0055416 | A1 | 3/2005 | Heikes et al. |
| 2005/0114777 | A1 | 5/2005 | Szeto |
| 2005/0125737 | A1* | 6/2005 | Allen et al. ............ 715/758 |
| 2005/0149622 | A1 | 7/2005 | Kirkland et al. |
| 2005/0181878 | A1 | 8/2005 | Danieli et al. |
| 2006/0004911 | A1 | 1/2006 | Becker et al. |
| 2006/0129643 | A1 | 6/2006 | Nielson et al. |
| 2007/0022172 | A1 | 1/2007 | Anglin et al. |
| 2007/0130275 | A1 | 6/2007 | Maresh |
| 2007/0168444 | A1 | 7/2007 | Chen et al. |
| 2008/0270916 | A1 | 10/2008 | Chen et al. |
| 2009/0019532 | A1 | 1/2009 | Jacobsen et al. |

FOREIGN PATENT DOCUMENTS

| | | |
|---|---|---|
| JP | 2001312446 A | 11/2001 |
| JP | 2004102358 A | 4/2004 |
| JP | 2005056332 A | 3/2005 |
| JP | 2005346704 A | 12/2005 |

OTHER PUBLICATIONS

Jackson et al., "Methodology for Query Search Structure Addressing for Calendar Users", IBM Technical Disclosure Bulletin, Apr. 1993, vol. 36, pub. 4, pp. 449-450.

Sun Microsystems Inc., "Sun Java Communications Suite 5 Evaluation Guide", Jul. 2007, 66 pages.

Sun Microsystems Inc., "Sun Java System Instant Messaging 7 2005Q1" Feb. 2005, 26 pages.

Non-Final Office Action dated Mar. 1, 2010 for U.S. Appl. No. 12/129,285.

Office action dated Mar. 1, 2010, regarding U.S. Appl. No. 12/129,285, 28 pages.

Final office action dated Aug. 2, 2010, regarding U.S. Appl. No. 12/129,285, 22 pages.

Final office action dated Jun. 18, 2009, regarding U.S. Appl. No. 11/334,228, 16 pages.

Office action dated Dec. 24, 2008, regarding U.S. Appl. No. 11/334,228, 17 pages.

\* cited by examiner

SCHEDULING CALENDAR ENTRIES VIA AN INSTANT MESSAGING INTERFACE

BACKGROUND OF THE INVENTION

1. Field of the Invention

The present invention relates generally to an improved data processing system, and in particular, the present invention provides a computer implemented method, data processing system, and computer program product for scheduling calendar entries from within the context of an instant messaging interface.

2. Description of the Related Art

Instant messaging is an online chat medium, allowing users to communicate with each other and to collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of both personal and business communications, functionality and usability enhancements are important to the continued success of this type of communication tool.

Although instant messaging systems allow users to communicate with each other in real-time, these existing instant messaging systems have several deficiencies with regard to managing instant message communications. Consider an example of a user who has a number of topics the user wants to discuss with people via instant messaging, but everyone the user wants to talk to is presently unavailable or not online. With current instant messaging systems, the user must remember or write down notes about whom the user needs to contact, and what the user needs to talk about. If the conversation must take place as soon as possible, the user may take extra steps to set an alert when the contact becomes available, or if the service provider allows, send an offline message to the contact. Conversely, if the conversation should not take place until a later time, then the user must make sure the user remembers about the conversation, or make sure the user's notes are saved and used as a reminder, such as in a calendar reminder entry. Problems associated with this existing method is that the user must use external systems to keep track of what the user needs to talk about, who the user needs to talk to, and when the conversation should take place. If the conversation must take place as soon as possible, the user must take steps to set an alert. If the conversation does not need to take place as soon as possible, the user must periodically check the contact list to see when the people the user needs to chat with become available. In addition, with the existing method, the user cannot pre-arrange a chat for a future time within the user's instant messaging system.

Therefore, it would be advantageous to have a computer implemented method, data processing system, and computer program product for overcoming the deficiencies in the existing art by providing a mechanism for scheduling calendar entries via an instant messaging interface.

SUMMARY OF THE INVENTION

Embodiments of the present invention provide a computer implemented method, data processing system, and computer program product for scheduling calendaring entries from within the context of an instant messaging interface. With the mechanism of the present invention, users are allowed to schedule chat and conference chat entries in the user's calendar system and pre-arrange who the user needs to talk to, what the user needs to talk about, as well as other details for the future chat session. An instant messaging client receives input from a user to schedule an instant messaging chat session with one or more invitees, wherein the one or more invitees are selected from a list of contacts in the instant messaging client. The instant messaging client provides a scheduling interface to the user, wherein the scheduling interface allows the user to define properties for the instant messaging chat session. Responsive to receiving user input defining the instant messaging chat session, an entry is created in the user's calendaring system to form a scheduled instant messaging chat session, wherein the entry is based on the properties defined in the scheduling interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
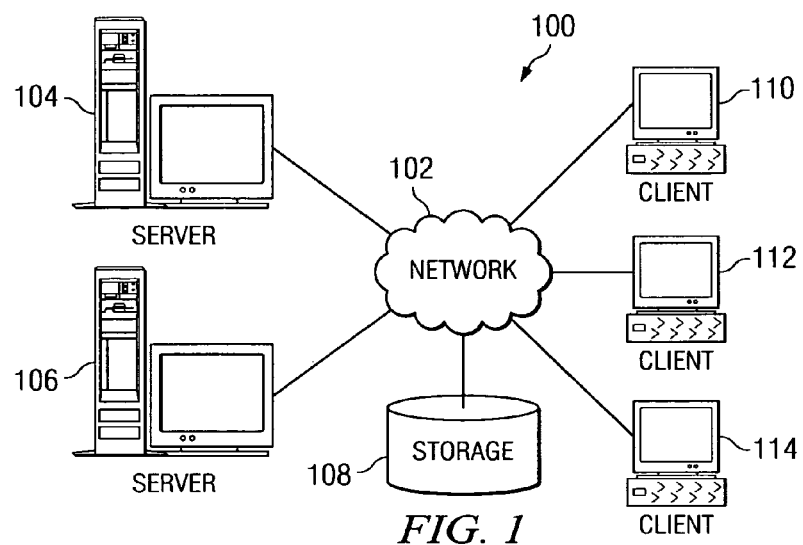
FIG. 1 depicts a representation of a network of data processing systems in which the present invention may be implemented.
Figure 2:
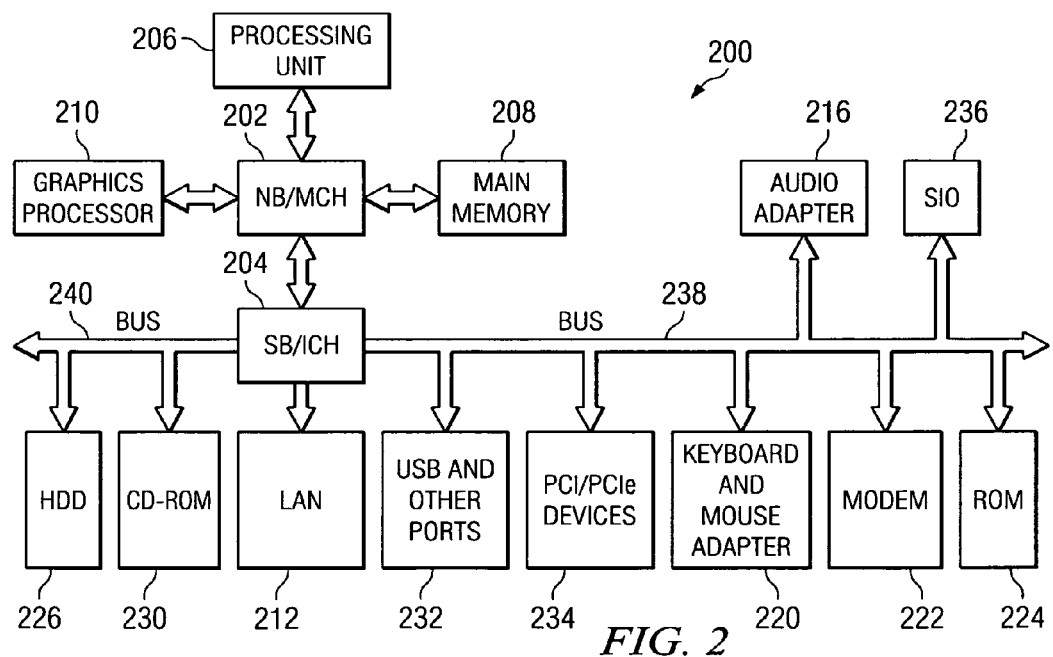
FIG. 2 is a block diagram illustrating a data processing system in which the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented.

Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Embodiments of the present invention provide scheduling and pre-arranging functionality to instant messaging clients to increase their ability to manage instant messaging communications. In particular, the mechanism of the present invention allows an instant messaging user to schedule future chat sessions in the user's calendaring system from within the context of the instant messaging client, and without requiring the user to create the entries within the calendaring system itself. The scheduling mechanism would also have a side benefit of allowing users to schedule regular calendar entries, which will not be conducted over instant messaging, in the midst of an instant messaging conversation with a person, without having to switch over to their calendaring system. The user's calendaring system may be a calendaring system implemented within the instant messaging client, or alternatively, a calendaring program external to the instant messaging client, such as, for example, Lotus Notes® or Microsoft Outlook®.

When scheduling a calendar entry for the future chat session from within the instant messaging client, the mechanism of the present invention allows the user to identify and schedule the people the user wants to talk to in the chat, the topics the user wants to discuss in the chat, and the details regarding the chat and what the user wants to say. For example, the user may select certain contacts from the user's instant messaging contact list and then select an option to schedule a chat for these contacts. The instant messaging system of the present invention may then associate the selected contacts with a calendaring event. In the calendaring event, the user is allowed to specify various properties of the chat, including the date and time of the chat, the chat subject, and what the user wants to discuss. An automated chat invitation may also be sent to the contact. The automated invitation may provide means for the contact to respond to the invitation, such as with key commands to accept, delay, or reschedule the chat. In addition, the contact may be allowed to delegate the scheduled chat to another contact or propose including additional contacts, thereby automating a conference chat. Within the response to the invitation, the contact may be able to amend the chat properties set by the user, such as the topic of the chat and the notes associated with the chat.

The scheduling system may also include a reminder feature that alerts the user and/or the contact that a chat is scheduled in 10 minutes, for example. This scheduling of chat may also be tempered by authorization rules, wherein contacts may allow or block chats from being scheduled for them. These authorization rules provides contacts with some privacy options, such as block all chat scheduling, allow particular people to schedule chats, and the like.

The scheduled calendar entries created by the user may be made available to the contacts who are invited to the chat. Similarly, the calendaring system in the instant messaging client may allow for integrating or exporting data into an external calendar system, such as Lotus Notes®, to create calendar entries there. When scheduling the chat, if the contact is also using a calendaring system compatible with the user's calendaring system, the contact's availability may be determined by checking the free time in the contact's calendaring system. Thus, the instant messaging system may determine the availability of the user's contact or group of contacts when scheduling the chat. Upon receiving an invite to a chat, the contact may confirm or modify the scheduled chat properties, similar to how it is performed in existing calendaring systems. In addition, if the schedule calendar information is published, other instant messaging users may be allowed (with permission granularity if desired) to subscribe to the published chat. This subscription mechanism may be especially useful for user groups or broadcasting type of events.

The process used to schedule a calendar entry from within an instant messaging client is dependent upon the particular configuration of the contact's system, such as whether or not the contact has a calendaring system compatible with the user's calendaring system, and whether or not the contact's instant messaging client comprises the mechanism of the present invention. Information regarding the capability of the contact's system and the particular configuration scenario in play may be obtained by the user's instant messaging client from the instant messaging server.

For example, in a first scenario (scenario 1), the user's instant messaging client, comprises the scheduling mechanism of the present invention, while the contact's instant messaging system does not. In addition, the user's and contact's calendaring systems are not compatible, and thus cannot interact with each other. In this situation, the user may schedule a chat with the contact in the user's calendaring system through the user's instant messaging client. The user determines when to schedule the chat by conversing with the contact and agreeing when they will meet. In this scenario, the user's instant messaging client does not have any information regarding the contact's availability or free time.

In a second scenario (scenario 2), the user's instant messaging client comprises the scheduling mechanism of the present invention, and the contact's instant messaging client does not. However, in this scenario, both the user and the contact share a common calendaring system. Sharing calendaring systems allows the user's instant messaging client to discover details about the contact's availability through the common calendaring systems. For example, if both calendaring systems are Lotus Notes®, the user may schedule a chat within the user's instant messaging client, and contact's free time may be determined within Lotus Notes® since the user and the contact are using the same integrated calendaring system. The instant messaging client itself does not check the contact's availability or free time, but rather the instant messaging client passes this duty to the shared calendaring system. However, unlike scenario 1, the user's instant messaging client is able to use the user's calendaring system to access the contact's schedule and see the contact's free time, so the user knows when to schedule the chat time and invite the contact to the meeting. The contact may then choose to accept or decline the invitation, and the contact's response is passed back to the user.

In a third scenario (scenario 3), the instant messaging clients of both the user and the contact comprise the scheduling mechanism of the present invention. In addition, both the user and the contact share a common calendaring system. In this particular case, the user may perform all of the actions in scenario 2, but the user may also specify different pre-filled data to be displayed to the chat windows, such that particular information is shown in the contact's chat window, and particular information is shown in the user's chat window.

In a fourth scenario (scenario 4), the instant messaging clients of both the user and the contact comprises the scheduling mechanism of the present invention. However, in this scenario, the user's and contact's calendaring systems are not compatible. Although the scheduling behavior is similar to scenario 3, the actual scheduling implementation is different, since the calendaring systems are not communicating with each other and scheduling free time and initiating chat invitations, but rather the instant messaging clients themselves are scheduling free time and initiating the chat invitations. In this scenario, when the user schedules a chat meeting, the user's calendaring system cannot confirm the meeting and details with the contact's calendaring system, nor can the user's calendaring system invite the contact since the user's calendaring system cannot talk to the contact's calendaring system. However, the user's instant messaging client may communicate with the contact's instant messaging client, and then the contact's instant messaging client may then check the contact's calendaring system (a completely different system from the user's calendaring system into which the user has no visibility). The contact's instant messaging client informs the contact's calendaring system that the user wants to set up a chat meeting with the contact at a particular time. If the contact is available at that time, the contact's calendaring system may accept the scheduled meeting, and if not, the system may decline the scheduled meeting and/or propose a different time.

Figure 3:
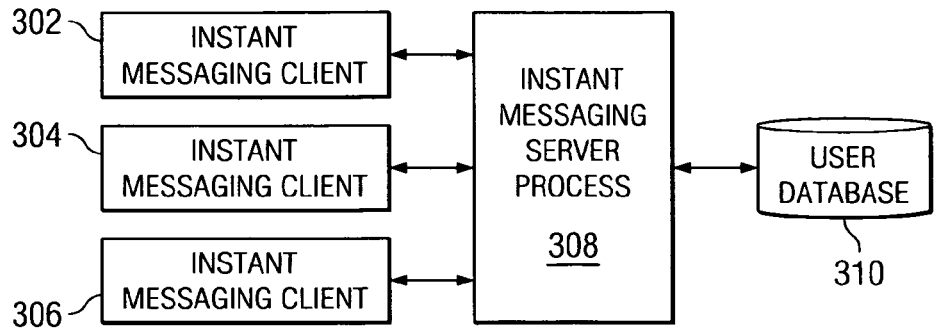
FIG. 3 is a block diagram illustrating components used in managing messages in accordance with an illustrative embodiment of the present invention.

Turning now to FIG. 3, a block diagram illustrating components used in an instant messaging system in accordance with a preferred embodiment of the present invention is shown. In this illustrative example, a user at instant messaging client 302 may send or exchange messages with other users at instant messaging clients 304 and 306. These instant messaging clients may be executing on a data processing system, such as data processing system 200 in FIG. 2. The exchange of messages in these examples is facilitated through instant messaging server process 308. This process allows for users to find other users within the instant messaging system as well as aid in the exchange of messages between different users.

Depending on the particular instant messaging system, instant messaging server process 308 may only be involved in providing an indication of when particular users are online and for establishing initial contacts while users contacting users already on a buddy list may contact those users directly after seeing that a particular user is online. Instant messaging server process 308 may be located on a server, such as servers 104 or 106 in FIG. 1.

In these examples, the different users registered to the instant messaging system are stored in user database 310. This user database provides information needed to search for and find other users as well as contact users when they are online.

Figure 4:
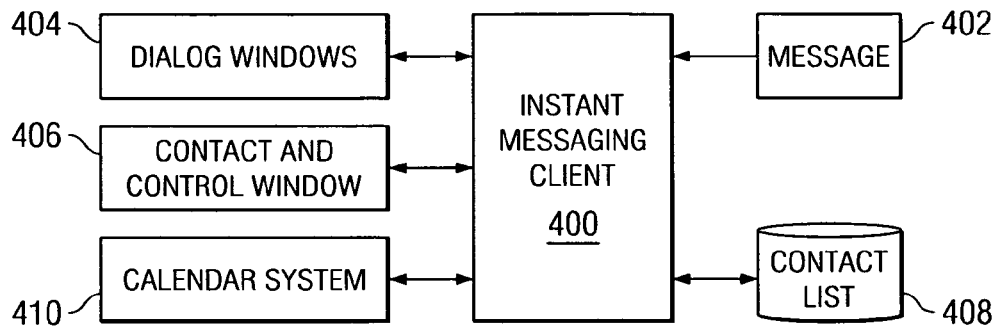
FIG. 4 is a diagram illustrating an instant messaging client in accordance with an illustrative embodiment of the present invention.

Turning next to FIG. 4, a diagram illustrating an instant messaging client is depicted in accordance with a preferred embodiment of the present invention. The components illustrated in FIG. 4 may be found in an instant messaging client, such as instant messaging clients 302, 304, or 306 in FIG. 3. These components may be implemented in a data processing system, such as data processing system 200 in FIG. 2.

In the illustrative example, instant messaging client 400 processes messages, such as message 402, received from users located on remote data processing systems. As messages are received, these messages are presented in dialog windows 404. Additionally, dialog windows 404 provide an interface for a user to input text to send messages to other users.

Contact and control window 406 is presented by instant messaging client 400 to provide the user with a list of user names, as well as other information. Contact and control window 406 also provides an interface to allow a user to set different preferences. For example, the user may set passwords required to access different names used in instant messaging sessions.

Also, a user may employ contact and control window 406 to set other preferences, such as colors and fonts used in instant messaging client 400. These preferences also may include whether a picture is to be sent when a session is initiated with another user. Depending on the implementation, the preference may be set to allow a user who receives messages to retrieve images of the senders from a remote database or a local cache.

Further, a list of names presented by contact and control window 406 is stored in contact list 408 in these examples. Additional user or screen names may be added to or deleted from contact list 408. This contact list is employed in presenting the list of names within contact and control window 406.

Calendar system 410 may be integrated into instant messaging client 400 in various ways. For instance, calendar system 410 may be a personal calendaring system, such as Lotus Notes® or Microsoft Outlook®, that is connected to instant messaging client 400 via a plugin or adapter. The mechanism of the present invention may use the calendaring system's existing application programming interface (API) to enable the instant messaging client to create entries in the calendar. A separate adapter may be created for each calendaring system.

In another example, calendar system 410 may also be built within the instant messaging client itself. In this case, the instant messaging client may mimic the capabilities of traditional calendaring systems by displaying selectable month/day/year and time options to the user, or alternatively, the instant messaging client may interpret specific syntax the user types into the chat window as a request to schedule a meeting. Existing chat clients have the capability to intercept text and handle the text as commands. Thus, when a user's instant messaging client sends text to a contact, the contact's instant messaging client may intercept the text not as text to be displayed to the user, but rather as commands to invoke the scheduling mechanism of the present invention. The user's instant messaging client may then handle the scheduling logic (e.g., identify scheduling conflicts, etc.) and add the scheduled chat entry to the user's calendar.

In a third example, calendar system 410 may be integrated with Web services that coordinate schedules, such as e-meeting conferencing and collaboration websites.

Figure 5A:
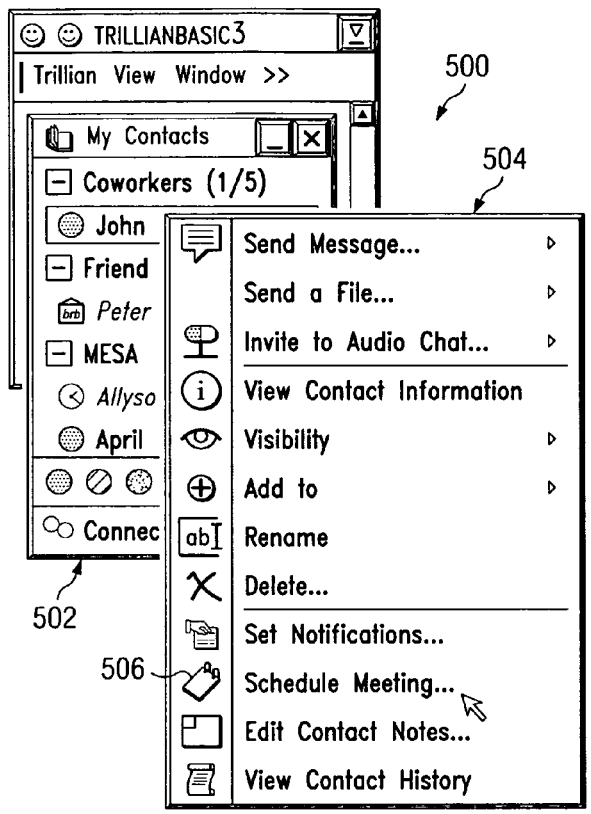
FIGS. 5A-5B are exemplary graphical user interfaces (GUIs) used to invoke a scheduling wizard for managing instant messaging chat schedules in accordance with an illustrative embodiment of the present invention.
Figure 5B:
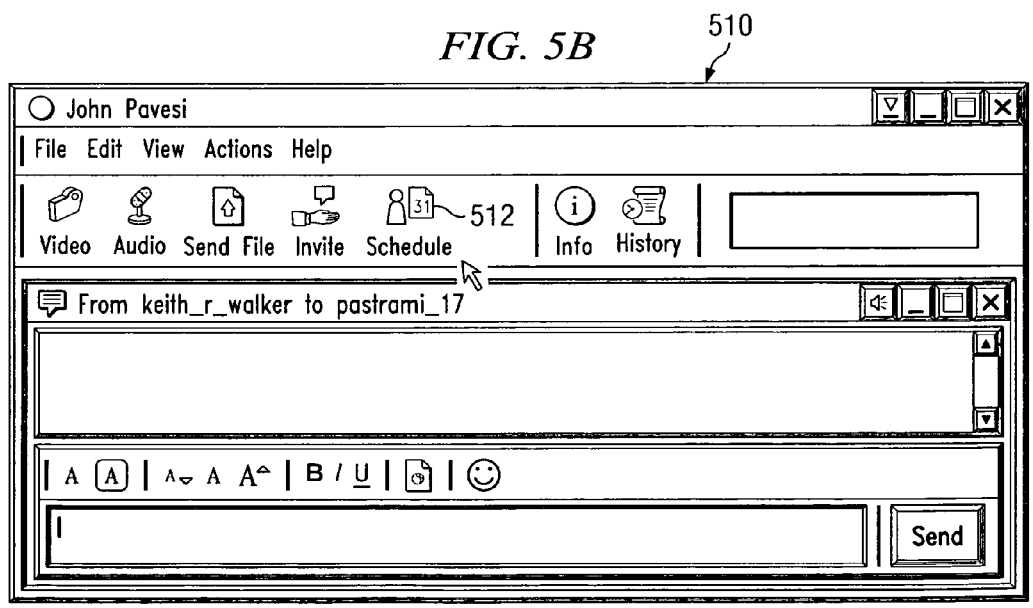

FIGS. 5A-5B are exemplary graphical user interfaces (GUIs) used to invoke a scheduling wizard for creating calendar entries within the context of an instant messaging client in accordance with an illustrative embodiment of the present invention. The graphical user interfaces may be provided to the user via an instant messaging client, such as instant messaging client 400, in FIG. 4. The graphical user interfaces are applicable in all four scenarios described above.

In the illustrative example in FIG. 5A, graphical user interface 500 comprises a user's contact list, such as contact and control window 406 in FIG. 4. Contact list window 502 displays the user's instant messaging contacts. The user may invoke the scheduling wizard of the present invention by selecting one or more contacts in contact list window 502, and then right clicking on the selected contacts. List of options 504 is subsequently presented to the user. The user may select an option, such as "Schedule Meeting" 506, to invoke the scheduling wizard in the example in FIG. 5A.

In the example in FIG. 5B, the user is allowed to invoke the scheduling wizard of the present invention within an already open chat window 510. For instance, the user in this example, keith_r_walker, may invoke the scheduling wizard to create a calendar entry for chat meeting with the user's current instant messaging contact, pastrami_17, who in this example has been given a friendly name of John Pavesi in the user's contact list, by selecting a scheduling option in the chat window, such as schedule button 512.

Although the examples in FIGS. 5A and 5B show particular scheduling options, one of ordinary skill in the art would recognize that other scheduling options may be used in the graphical user interface to invoke the scheduling wizard of the present invention and provide the user with the capability to manage instant message communications.

Figure 6:
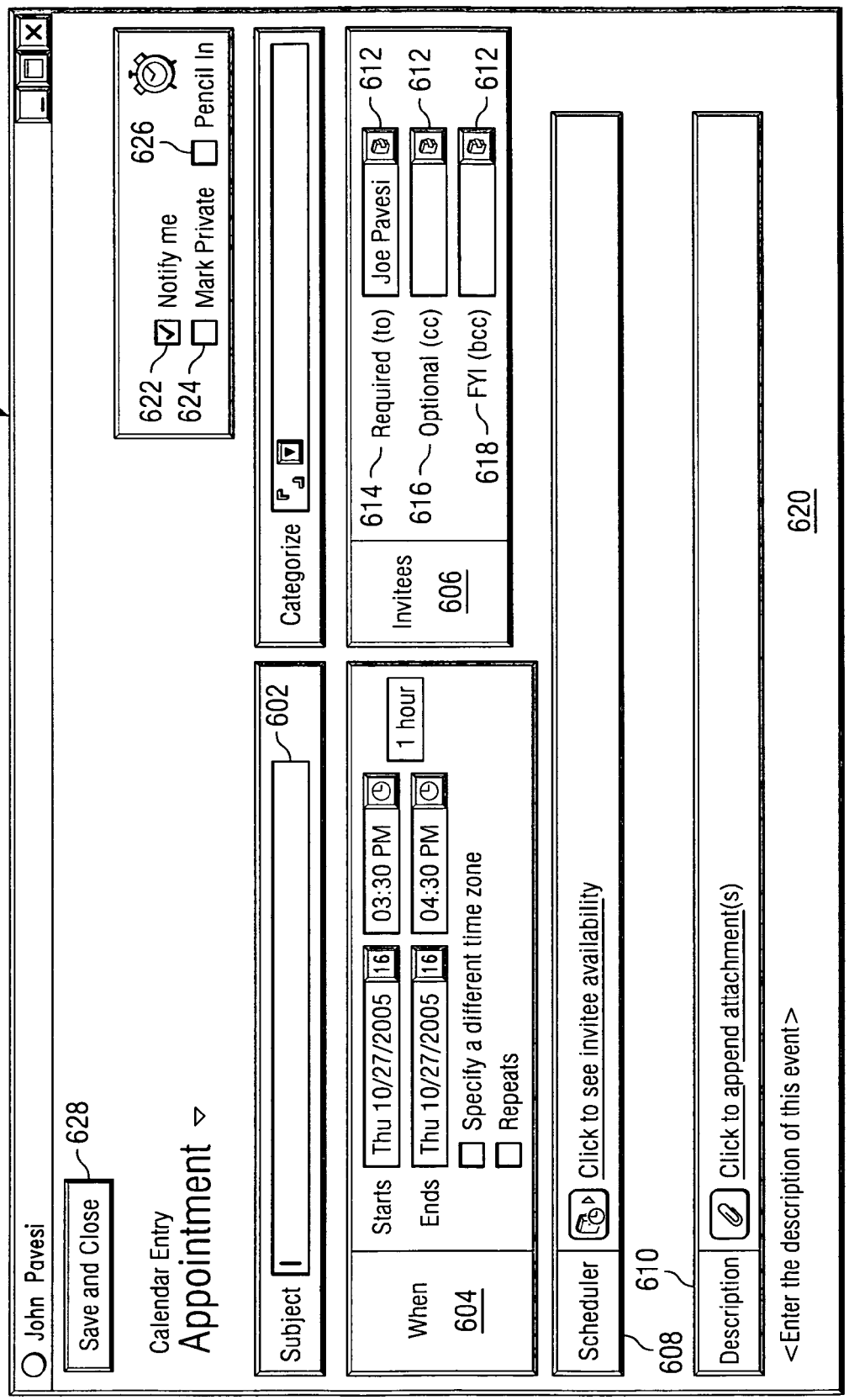
FIG. 6 is an exemplary graphical user interface for scheduling instant messaging chats in accordance with an illustrative embodiment of the present invention.

FIG. 6 is an exemplary graphical user interface for scheduling instant messaging chats in accordance with an illustrative embodiment of the present invention. The graphical user interface comprises a scheduling window 600, which is provided to the user when the user invokes the scheduling wizard of the present invention, such as by selecting contacts within whom the user wants to schedule a chat session as described in FIGS. 5A-B. Scheduling window 600 is applicable in all four scenarios described above. Within scheduling window 600, the user may select a chat meeting time and set appropriate properties for the chat. Scheduling window 600 may be presented to the user via the instant messaging client, such as instant messaging client 400, in FIG. 4.

In this illustrative example, scheduling window 600 comprises subject field 602, date/time fields 604, invitees fields 606, scheduler 608, and description field 610. When scheduling the chat meeting, the user may assign a subject or topic to the chat by entering text within subject field 602. The user sets the time frame of the chat meeting through date/time fields 604. The user may set the beginning and end date and times for the chat meeting, as well as specify a different time zone for the meeting or repeat the scheduled meeting a specified intervals.

Invitees fields 606 include names or IDs of the user's instant messaging contacts with whom the user wants to schedule the chat meeting. When scheduling window 600 is presented to the user, invitees fields 606 may be populated with the contacts the user specified in FIGS. 5A and 5B. The user may then add or remove contacts listed in invitees fields 606 as necessary. If the user selects multiple invitees to attend the chat meeting, an invitation may be sent to the contacts for a conference chat. Selecting a single invitee will result in a personal chat window being displayed to the user for the meeting. The user may click on book icons 612 to display a list of the user's instant messaging contacts from which the user may choose, or alternatively, the user may type a name in an invitee field free form.

One or more invitees fields may be used in scheduling window 600. Using multiple invitee fields allows the scheduled chat to behave differently for the different invitees. For example, contacts listed in required invitee field 614 may receive a conference chat (or be engaged in regular chat) in the typical fashion. Contacts listed in optional 616 and FYI invitee 618 fields may receive a conference chat in the same manner as would a contact in required invitee field 614, however, the features that alert the user when those contacts are online or that automatically invite those contacts when the contacts come online are disabled. In scenarios 3 and 4, optional 616 and FYI invitee 618 fields may also be indicated as such in the contact's calendaring system, assuming that the contact has these fields.

Scheduler 608 provides a free time search that enables the user to check a contact's calendar for the best time to schedule a meeting. As scheduler 608 is used to check the contact's calendaring system for the contact's availability, the scheduler is only available (visible) to the user in scenarios 2-4. Thus, when scheduling an instant messaging chat meeting with a contact, the user's instant messaging client may request information regarding the contact's capability from the instant messaging server, which reports to the user's instant messaging client which particular scenario (1-4) is in play, and then draws scheduling window 600 appropriately by either showing or hiding scheduler 608. For scenarios 2-4, the interface is identical, but the backend logic for drawing scheduling window 600 is different. For scenarios 2 and 3, scheduler 608 interacts with the user's calendaring system, which uses its internal functions to check the contact's calendar for availability information. For scenario 4, scheduler 608 interacts with the user's calendaring system and sends a request for the contact's availability to the contact's instant messaging client, which in turn sends a request to the contact's calendaring system.

Description field 610 may be used to enter text that the user wants pre-filled in the chat window. In scenarios 3 and 4, the user may enter text to be pre-filled in text to send box 620, as well as attach documents to the chat window. Other traditional scheduling options, such as, for example, notify me 622, mark private 624, or pencil in 626, may be used to further define the scheduled event.

In scenario 1, an option to save the scheduled event in the form of "Save and Close" button 628 may be provided in scheduling window 600, as the user essentially creates an appointment or reminder in the user's calendar for the scheduled chat session. For scenarios 2-4, save and close button 628 in scheduling window 600 may more appropriately be labeled as "Save and Send Invitations", since the instant messaging client's interactions with the contact's calendar is more similar to scheduling a meeting.

Once the save and close button or save and send invitations button has been selected by the user, a display may be provided to the contact depending upon the particular scenario in play. In scenario 1, the contact sees nothing because no actual invite has been sent to the contact. The contact does not have a calendaring system, nor does the contact have a calendar that may be accessed via a shared calendar system or the instant messaging system of the present invention. In scenario 2, the contact eventually sees an invitation appear in the contact's calendaring system, but no such invitation will appear immediately in their instant messaging client. The text of the invitation may also be sent as an instant message, however, the contact cannot accept or reject the invitation within the instant messaging client, nor is the text in the instant message able to create an entry in the contact's calendaring system. Instead, the contact must wait for the calendar invite to arrive in the contact's calendaring system. In scenarios 3 and 4, the contact's instant messaging client receives the invite request, in addition to the details of the invitation. In one embodiment, the instant messaging client provides buttons that allow the contact to accept, reject, propose an alternate time, etc. These buttons may create (or not create) the entry in the contact's calendar, and may likewise interact with the user's calendar system immediately. For instant messaging systems that display status, such as "Keith Walker is typing a message . . . ", a status for the user may be displayed to the contact, such as "Keith Walker is scheduling an IM meeting with you . . . ", which remains active while the user has scheduling window 600 open. Conversely, after the user has sent an invite to the contact, a status for the user sent as text, as opposed to just a temporary status, may be sent to the contact, such as "John Pavesi has accepted your invitation". If the contact has engaged the contact's scheduling wizard to propose an alternate time, then the user may see a status for the contact, such as "John Pavesi is proposing an alternate time."

Figure 7:
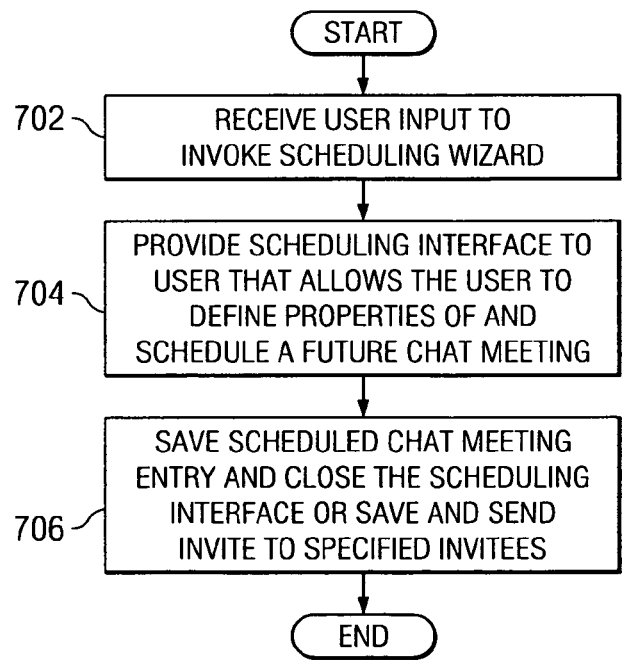
FIG. 7 is a flowchart of a process for creating a calendar entry from within the context of an instant messaging interface in accordance with an illustrative embodiment of the present invention.

Turning now to FIG. 7, a flowchart of an exemplary process for creating a calendar entry from within the context of an instant messaging window in accordance with an illustrative embodiment of the present invention is shown. The process illustrated in FIG. 7 may be implemented in an instant messaging client, such as instant messaging client 400 in FIG. 4. The process is applicable in all four scenarios described above, where (1) only the user has a calendar and the instant messaging system of the present invention, (2) the user and the user's contacts have a shared calendar system but only the user has the instant messaging system of the present invention, (3) the user and the user's contacts have both a shared calendar system and the instant messaging system of the present invention; and (4) the user and the user's contacts have the instant messaging system of the present invention but do not share a common calendaring system.

The process begins with receiving an input from a user to invoke the scheduling wizard of the present invention (step 702). For example, the user may invoke the scheduling wizard by right-clicking on one or more contacts in the user's contact list and then selecting a scheduling option, such as "Schedule Meeting". The user may also invoke the scheduling wizard within an already open chat window by selecting a scheduling option, such as a "schedule" button.

Upon invoking the scheduling wizard, a scheduling interface is provided to the user that allows the user to define properties in the chat meeting (step 704). For instance, the scheduling interface may be a scheduling window comprising a subject field, date/time fields, invitee fields, a scheduler, and a description field. The invitees field may comprise those contacts the user has selected to attend the chat meeting. The scheduler may comprise a search tool that enables the user to check the contact's calendar for the best time to schedule the chat meeting. The description field may comprise a text box in which the user may enter text that will be pre-filled in the chat window, as well as allows the user to specify documents that will be attached to the chat window.

Once specific properties have been entered for the scheduled chat meeting by the user, based on the particular scenario in play, the mechanism of the present invention may just save the scheduled chat meeting and close the window, or save and send invites to the specified invitees in the scheduled chat meeting based on the particular scenario in play (step 706). If the user is allowed to send invitations to the chat meeting, the contact may, in one embodiment for scenario 2, receive the invitation to the chat meeting through the contact's calendaring system. In another embodiment for scenarios 3 and 4, the contact may receive in the contact's instant messaging client the invite request, along with the details of the invitation. The contact's instant messaging client may have buttons to accept, reject, propose an alternate time, etc., and these buttons may be used to create the entry in the contact's calendar, and may likewise interact with the user's calendar system immediately.

Thus, the mechanism of the present invention allows instant messaging clients to increase their ability to manage instant messaging communications. The advantages provided by the mechanism of the present invention over current instant messaging systems include enabling an instant messaging user to schedule future chat sessions in the user's calendaring system from within the context of the instant messaging client, and without requiring the user to create the entries within the calendaring system itself.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system is suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for scheduling calendar entries within a context of an instant messaging client, the computer implemented method comprising:

receiving input from a user to schedule an instant messaging chat session with one or more invitees, wherein the one or more invitees are selected from a list of contacts in the instant messaging client;

providing a scheduling interface to the user via the instant messaging client in response to receiving the input, wherein the scheduling interface allows the user to define properties for scheduling the instant messaging chat session from within the instant messaging client, and wherein the defined properties include content to be pre-filled into the instant messaging chat session when the instant messaging chat session is initiated; and responsive to receiving user input defining the properties for scheduling the instant messaging chat session, creating an entry in a calendaring system of the user to form a scheduled instant messaging chat session, wherein the calendaring system of the user is implemented as a calendaring program external to the instant messaging client, and wherein the entry is based on the properties defined in the scheduling interface.

2. The computer implemented method of claim 1, wherein providing the scheduling interface to the user further comprises:

requesting instant messaging scheduling and calendaring system capability information of an invitee from an instant messaging server; and receiving the instant messaging scheduling and calendaring system capability information from the instant messaging server, wherein the instant messaging scheduling and calendaring system capability information is used by the instant messaging client to adjust a content of the scheduling interface provided to the user.

3. The computer implemented method of claim 1, wherein the creating step further comprises:
   checking calendaring systems of the one or more invitees to determine availability of the one or more invitees;
   scheduling the instant messaging chat session based on the availability of the one or more invitees.

4. The computer implemented method of claim 1, further comprising:
   sending an invitation to the instant messaging chat session to the one or more invitees.

5. The computer implemented method of claim 4, wherein the invitation includes options allowing the one or more invitees to accept, delay, or reschedule the scheduled instant messaging chat session.

6. The computer implemented method of claim 4, wherein the invitation includes options allowing the one or more invitees to at least one of delegate the instant messaging chat session to another person or automate a conference chat by proposing additional people be invited to the instant messaging chat session.

7. The computer implemented method of claim 1, wherein the invitation includes options allowing the one or more invitees to amend the properties defined by the user.

8. The computer implemented method of claim 1, wherein the properties defined in the scheduling interface include a date and time of the instant messaging chat session, topics to be discussed in the instant messaging chat session, notes regarding the instant messaging chat session, and documents related to the instant messaging chat session.

9. The computer implemented method of claim 1, further comprising:
   wherein the properties include a reminder feature that alerts the user that the scheduled instant messaging chat session will begin within a specified time period.

10. The computer implemented method of claim 1, wherein an invitee in the one or more invitees uses authorization rules to allow or block users from scheduling instant messaging chats with the invitee.

11. A data processing system for scheduling calendar entries within a context of an instant messaging client, the data processing system comprising:
   a bus;
   a storage device connected to the bus, wherein the storage device contains computer usable code;
   at least one managed device connected to the bus;
   a communications unit connected to the bus; and
   a processing unit connected to the bus, wherein the processing unit executes the computer usable code to receive input from a user to schedule an instant messaging chat session with one or more invitees, wherein the one or more invitees are selected from a list of contacts in the instant messaging client, provide a scheduling interface to the user via the instant messaging client in response to receiving the input, wherein the scheduling interface allows the user to define properties for scheduling the instant messaging chat session from within the instant messaging client, and wherein the defined properties include content to be pre-filled into the instant messaging chat session when the instant messaging chat session is initiated, and create an entry in a calendaring system of the user to form a scheduled instant messaging chat session in response to receiving user input defining properties for scheduling the instant messaging chat session, wherein the calendaring system of the user is implemented as a calendaring program external to the instant messaging client, and wherein the entry is based on the properties defined in the scheduling interface.

12. The computer implemented method of claim 1, further comprising:
   displaying, in respective instant messaging windows of the selected one or more invitees, an instant messaging status of the user while the instant messaging scheduling window is presented to the user, wherein the instant messaging status indicates the user is scheduling an instant messaging chat session with the selected one or more invitees.

13. The computer implemented method of claim 1, wherein the defined properties include content to be attached as a document to the instant messaging chat session when the instant messaging chat session is initiated.

14. The data processing system of claim 11, wherein the computer usable code to provide the scheduling interface to the user further comprises computer usable code to request instant messaging scheduling and calendaring system capability information of an invitee from an instant messaging server, and receive the instant messaging scheduling and calendaring system capability information from the instant messaging server, wherein the instant messaging scheduling and calendaring system capability information is used by the instant messaging client to adjust a content of the scheduling interface provided to the user.

15. The data processing system of claim 11, wherein the computer usable code to create a entry in a calendaring system of the user further comprises computer usable code to check calendaring systems of the one or more invitees to determine availability of the one or more invitees, and schedule the instant messaging chat session based on the availability of the one or more invitees.

16. The data processing system of claim 11, wherein the properties defined in the scheduling interface include a date and time of the instant messaging chat session, topics to be discussed in the instant messaging chat session, notes regarding the instant messaging chat session, and documents related to the instant messaging chat session.

17. A computer program product for scheduling calendar entries within a context of an instant messaging client, the computer program product comprising:
   a computer usable storage medium having computer usable program code stored thereon, the computer usable program code comprising:
   computer usable program code for receiving input from a user to schedule an instant messaging chat session with one or more invitees, wherein the one or more invitees are selected from a list of contacts in the instant messaging client;
   computer usable program code for providing a scheduling interface to the user via the instant messaging client in response to receiving the input, wherein the scheduling interface allows the user to define properties for scheduling the instant messaging chat session from within the instant messaging client, and wherein the defined properties include content to be pre-filled into the instant messaging chat session when the instant messaging chat session is initiated; and
   computer usable program code for creating an entry in a calendaring system of the user to form a scheduled instant messaging chat session in response to receiving user input defining the properties for scheduling the instant messaging chat session, wherein the calendaring system of the user is implemented as a calendaring program external to the instant messaging client, and wherein the entry is based on the properties defined in the scheduling interface.

18. The computer program product of claim 17, wherein the computer usable program code for providing the scheduling interface to the user further comprises:

computer usable program code for requesting instant messaging scheduling and calendaring system capability information of an invitee from an instant messaging server; and computer usable program code for receiving the instant messaging scheduling and calendaring system capability information from the instant messaging server, wherein the instant messaging scheduling and calendaring system capability information is used by the instant messaging client to adjust a content of the scheduling interface provided to the user.

19. The computer program product of claim 17, wherein the properties defined in the scheduling interface include a date and time of the instant messaging chat session, topics to be discussed in the instant messaging chat session, notes regarding the instant messaging chat session, and documents related to the instant messaging chat session.

* * * * *